Patented July 19, 1949

2,476,270

UNITED STATES PATENT OFFICE 2,476,270

PREPARATION OF 1,1-DICYANO ETHYLENE BY THE PYROLYSIS OF 1-ACETOXY-1,1-DICYANO ETHANE

Alan E. Ardis, Akron, Ohio, assignor to The B. F. Goodrich Company, New York, N. Y., a corporation of New York No Drawing. Application November 12, 1947, Serial No. 785,520

9 Claims. (Cl. 260—465.8)

This invention relates to a method for the preparation of 1,1-dicyano ethylene which method involves the pyrolytic deacetoxylation of 1-acetoxy-1,1-dicyano ethane.

I have discovered that 1,1-dicyano ethylene may be readily prepared in good yields by the pyrolysis of 1-acetoxy-1,1-dicyano ethane. In addition to the 1,1-dicyano ethylene, some acetic acid is also formed.

The pyrolysis reaction proceeds substantially as follows:

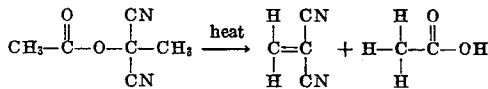

This reaction provides a valuable and economical method for the preparation of 1,1-dicyano ethylene since the starting reactant, 1-acetoxy-1,1-dicyano ethane, is easily prepared by the dimerization of acetyl cyanide which in turn can be made from acetic anhydride and sodium cyanide or by the reaction of ketene and hydrogen cyanide.

The temperature at which the pyrolysis is conducted may be varied widely. Temperatures in the range of 400° to 750° C. are operative with the preferred range being from 600° to 650° C.

Increased yields of 1,1-dicyano ethylene are obtained when a substance is used to catalyze the pyrolysis. Among the materials which have been found useful in this connection are metallic chlorides, and especially chlorides of those metals occurring in Group II of the periodic table including beryllium, magnesium, calcium, zinc, strontium, cadmium and barium, with zinc chloride being the preferred catalyst. The amount of catalyst is not critical and may be varied considerably. For example, amounts of catalyst as low as one part by weight to eight parts or even more of 1-acetoxy-1,1-dicyano ethane and as high as one part or more of catalyst to one part of 1-acetoxy-1,1-dicyano ethane may be used. The catalyst may be dispensed with entirely if desired and 1,1-dicyano ethylene still obtained.

The pyrolysis reaction can be conducted in several manners. The preferred method involves passing vapors of 1-acetoxy-1,1-dicyano ethane (a white solid melting at 70° C.) through a metal tube, preferably brass, which is connected to a receiver, preferably provided with external cooling means. Variations in this method involve the use of a glass pyrolysis tube instead of a metal tube, or pyrolyzing the starting material over a hot resistance wire. The pyrolysis is preferably conducted at reduced pressures, especially from 2 to 50 mm., although pressures up to and including atmospheric pressure are operative.

The liquid product which collects in the receiver is a mixture of unreacted 1-acetoxy-1,1-dicyano ethane, acetic acid and 1,1-dicyano ethylene. The 1,1-dicyano ethylene is then separated from the mixture by utilizing any of several methods of separation. For example, one method of separating the 1,1-dicyano ethylene consists in utilizing the tendency of monomeric 1,1-dicyano ethylene to autopolymerize and allowing it to polymerize as it forms, or pouring the liquid product into water to hasten polymerization, after which the solid polymeric 1,1-dicyano ethylene can be easily separated from the liquid materials by filtration or decantation. The polymerized 1,1-dicyano ethylene can then be depolymerized by pyrolysis, preferably at temperatures of 170° to 250° C., to obtain monomeric 1,1-dicyano ethylene.

A second useful method consists in extracting the 1,1-dicyano ethylene from the liquid mixture by use of a solvent, preferably one from which the 1,1-dicyano ethylene will crystallize. This is done, for example, by mixing the liquid product and dry toluene or similar aromatic hydrocarbon, preferably in equal volumes, and cooling the mixture to a temperature of —20° C. or lower, whereupon monomeric 1,1-dicyano ethylene separates from the liquid mixture in form of crystals which are easily isolated as by filtration. The toluene layer is then decanted if desired and the supernatant liquid distilled to recover any uncrystallized monomer. High yields of very pure monomer are obtained by this method.

A third method involves treating the liquid product with a conjugated diolefin such as butadiene or cyclopentadiene which reacts with the 1,1-dicyano ethylene to form a solid substituted cyclohexene which can be separated from the acetic acid and other impurities and pyrolyzed again at temperatures in excess of 400° C. to give monomeric 1,1-dicyano ethylene and the conjugated diolefin. Still a fourth method consists in distillation of the liquid product, preferably at reduced pressure, to obtain a fraction consisting substantially of 1,1-dicyano ethylene.

When using any of the latter three methods, it is desirable that the 1,1-dicyano ethylene be stabilized against polymerization from the time that it is formed. This may be accomplished by using a suitable 1,1-dicyano ethylene stabilizer (that is, a polymerization inhibitor) which may be mixed with the 1-acetoxy-1,1-dicyano ethane prior to pyrolysis or placed in the receiver for the liquid pyrolysis product. Such a stabilizer is also preferably present in the receiver used to collect the 1,1-dicyano ethylene when it is separated by distillation and when it is desired to obtain the monomer by pyrolysis of the polymer or the conjugated diolefin addition product. Suitable 1,1-dicyano ethylene stabilizers include phosphorus pentoxide and phosphorus pentasulfide, which are preferred, as well as antimony pentoxide, concentrated sulfuric acid and other materials reactive with water, since polymerization is catalyzed by even small amounts of hydroxyl ion. The stabilizer may be present in any desired amount but in general as little as 0.5 to 3.0% based on the amount of monomer is sufficient to prevent polymerization for extended periods of time.

The following examples are intended to illustrate the preparation of 1,1-dicyano ethylene by the method of this invention, but are not intended to limit the invention, for there are, of course, numerous modifications. All parts are by weight.

Example I 80 parts of 1-acetoxy-1,1-dicyano ethane and 10 parts of zinc chloride are heated until vaporized and the vapors passed at 5 mm. pressure through a brass tube heated to a temperature of 560° C. 67 parts of liquid product are collected in a receiver which is cooled in acetone-dry-ice bath. The liquid product is then distilled at a pressure of 5 mm. whereupon 18.5 parts (53% yield) of 1,1-dicyano ethylene, partly in the polymeric form, are obtained.

When this example is repeated in the absence of the zinc chloride catalyst, 1,1-dicyano ethylene is again obtained in yields which may be as high as 25%. Yields of 1,1-dicyano ethylene of about 20 to 50% are also secured when the zinc chloride of the example is replaced by other metal chlorides such as beryllium chloride which are volatile under the pyrolysis conditions.

Example II 80 parts of 1-acetoxy-1,1-dicyano ethane and 10 parts of zinc chloride are heated and the vapors passed through a brass pyrolysis tube in combination with an ice-cooled receiver. The pyrolysis is conducted at a temperature of 675° C. and at a pressure of 7 mm. 54 parts of liquid product are collected. The liquid product is then poured into water whereupon the 1,1-dicyano ethylene polymerizes and the resulting solid polymer is separated by filtering. 25 parts (66⅔%) of 1,1-dicyano ethylene are obtained. The polymeric material may then be quantitatively converted into monomer by heating to 200° C.

Example III 40 parts of 1-acetoxy-1,1-dicyano ethane and 40 parts of zinc chloride are heated and the vapors passed through a brass pyrolysis tube which also contains brass chain packing. The pyrolysis tube is in combination with an ice-cooled receiver. A temperature of 670° C. and a pressure of 9 mm. is maintained throughout the reaction period. 34 parts of liquid product are collected in the receiver. The liquid product is then fractionally distilled at a reflux ratio of 1:1 and 23 parts of a fraction consisting of 1,1-dicyano ethylene are obtained. The 1,1-dicyano ethylene is collected in the monomeric form but polymerizes rapidly on standing to a hard, clear material.

Example IV 10 parts of 1-acetoxy-1,1-dicyano ethane and 10 parts of zinc chloride are pyrolyzed over a red hot nickel wire at a temperature of 600° C. and a pressure of 10 mm. 6 parts of liquid product are collected in the receiver which is cooled in a dry ice bath. The liquid product is then heated whereupon the 1,1-dicyano ethylene polymerizes to a solid material and is separated by filtering. Upon further heating of the solid polymer at 200° C. in the presence of phosphorus pentoxide, the 1,1-dicyano ethylene depolymerizes and 4 parts of monomeric 1,1-dicyano ethylene (M. P. 8° C.) are obtained.

Example V 80 parts of 1-acetoxy-1,1-dicyano ethane, 20 parts zinc chloride, and 3 parts of phosphorus pentoxide are heated to a temperature of 460° C. and a pressure of 7 mm. Pyrolysis occurs and 28 parts of liquid product are obtained. The liquid product is then added to 20 parts of butadiene and the mixture thus formed is placed in a sealed reaction tube for 20 hours at room temperature. The tube is then opened and the contents distilled at 450° C. into a receiver lined with phosphorus pentoxide. 10 parts of monomeric 1,1-dicyano ethylene (M. P. 8° C., $N_D^{20}$ 1.4440) are obtained.

Example VI 80 parts of 1-acetoxy-1,1-dicyano ethane and 40 parts of zinc chloride are heated and the vapors passed through a glass tube filled with ceramic packing and maintained at a temperature of 510° C. and a pressure of 15 mm. 50 parts of liquid product are collected. 28 parts of this liquid product are then treated as in Example II and a 44% yield of 1,1-dicyano ethylene is obtained.

Example VII 40 parts of 1-acetoxy-1,1-dicyano ethane and 50 parts of zinc chloride are heated and the vapors passed at a temperature of 670° C. and a pressure of 9 mm. through a brass tube containing brass chain packing. 34 parts of liquid product are collected in a cooled receiver. The liquid product is then poured into water whereupon the 1,1-dicyano ethylene present in the liquid product polymerizes to a solid material. The water solution is then distilled to separate the acetic acid and unreacted 1-acetoxy-1,1-dicyano ethane. 23 parts of the polymerized 1,1-dicyano ethylene are recovered.

Example VIII 80 parts of liquid product obtained as in Example III are distilled to yield 24 parts of an intermediate fraction ($N_D^{20}$ 1.430) which is mixed with an equal volume of dry toluene and the mixture cooled to —25° C. Crystals of monomeric 1,1-dicyano ethylene are formed and removed by filtering. The filtrate is decanted and distilled to recover uncrystallized 1,1-dicyano ethylene. 15 parts of monomeric 1,1-dicyano ethylene are obtained.

1,1-dicyano ethylene prepared by the method of this invention is very valuable for the preparation of polymers and copolymers suitable as synthetic rubbers, synthetic resins, and plastics. Furthermore, polymeric 1,1-dicyano ethylene and copolymers of 1,1-dicyano ethylene and other materials polymerizable therewith, may be spun into synthetic filaments which possess many valuable properties including great tensile strength, flexibility, and resistance to chemicals.

Numerous variations and modifications in the above procedure will be apparent to those skilled

I claim:

1. The method which comprises pyrolyzing 1-acetoxy-1,1-dicyano ethane at a temperature of 400° to 750° C. and separating 1,1-dicyano ethylene from the pyrolysis reaction mixture.

2. The method which comprises pyrolyzing 1-acetoxy-1,1-dicyano ethane at a temperature of 400° to 750° C., at a reduced pressure and in the presence of a chloride of a metallic element occurring in group II of the periodic table, and separating 1,1-dicyano ethylene from the pyrolysis reaction mixture.

3. The method which comprises pyrolyzing 1-acetoxy-1,1-dicyano ethane at a temperature of 400° to 750° C., at a pressure of 5 to 50 mm. of Hg. and in the presence of zinc chloride and separating 1,1-dicyano ethylene from the pyrolysis reaction mixture.

4. The method which comprises pyrolyzing 1-acetoxy-1,1-dicyano ethane at a temperature of 600° C. to 650° C., at a pressure of 2 to 50 mm. of Hg. and in the presence of zinc chloride, and separating 1,1-dicyano ethylene from the pyrolysis reaction mixture.

5. The method which comprises pyrolyzing 1-acetoxy-1,1-dicyano ethane at a temperature of 400° to 750° C., at a reduced pressure and in the presence of a chloride of a metallic element occurring in group II of the periodic table, collecting the pyrolysis reaction mixture in the presence of phosphorus pentoxide, and separating monomeric 1,1-dicyano ethylene from the pyrolysis reaction mixture.

6. The method which comprises pyrolyzing 1-acetoxy-1,1-dicyano ethane at a temperature of 400° to 750° C., at a pressure of 2 to 50 mm. Hg., and in the presence of zinc chloride, collecting the pyrolysis reaction mixture in the presence of phosphorus pentoxide, and separating monomeric 1,1-dicyano ethylene from the pyrolysis reaction mixture.

7. The method which comprises pyrolyzing 1-acetoxy-1,1-dicyano ethane at a temperature of 600° C., at a pressure of 5 to 50 mm. Hg. and in the presence of zinc chloride, collecting the pyrolysis reaction mixture in the presence of phosphorus pentoxide, and separating monomeric 1,1-dicyano ethylene from the pyrolysis reaction mixture.

8. The method which comprises pyrolyzing 1-acetoxy-1,1-dicyano ethane at a temperature of 400° to 750° C., at a pressure of 2 to 50 mm. Hg. and in the presence of zinc chloride, admixing the resulting pyrolysis reaction mixture with water whereupon the 1,1-dicyano ethylene polymerizes to a solid material, separating the solid polymerized 1,1-dicyano ethylene from the water mixture and heating the said polymerized 1,1-dicyano ethylene at a temperature of 170° to 250° C. in the presence of phosphorus pentoxide to obtain monomeric 1,1-dicyano ethylene.

9. The method which comprises pyrolyzing 1-acetoxy-1,1-dicyano ethane at a temperature of 400° C. to 750° C., at a pressure of 2 to 50 mm. Hg. and in the presence of zinc chloride, collecting the pyrolysis reaction mixture in the presence of phosphorus pentoxide, admixing the resulting pyrolysis mixture with toluene, cooling the resulting mixture to a temperature below —20° C. whereupon monomeric 1,1-dicyano ethylene separates from the liquid mixture in the form of crystals, and filtering said crystals of monomeric 1,1-dicyano ethylene from the liquid mixture.

ALAN E. ARDIS.

REFERENCES CITED

The following references are of record in the file of this patent:

UNITED STATES PATENTS

| Number | Name | Date |
|---|---|---|
| 2,183,357 | Ritchie et al. | Dec. 12, 1939 |
| 2,208,328 | Lichty | July 16, 1940 |
| 2,301,131 | Lichty | Nov. 3, 1942 |
| 2,328,890 | Clifford et al. | Sept. 7, 1943 |
| 2,395,930 | Johnston et al. | Mar. 5, 1946 |
| 2,396,586 | Long | Mar. 12, 1946 |

OTHER REFERENCES

Ostling, Chem. Abstracts, vol. 15, page 2829 (1921).